(12) United States Patent
Hiyori (10) Patent No.: US 8,780,254 B2
(45) Date of Patent: Jul. 15, 2014

(54) EYEPIECE OPTICAL SYSTEM AND IMAGING DEVICE

(71) Applicant: Sony Corporation, Tokyo (JP)

(72) Inventor: Chiharu Hiyori, Kanagawa (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 13/722,490

(22) Filed: Dec. 20, 2012

(65) Prior Publication Data

US 2013/0188072 A1   Jul. 25, 2013

(30) Foreign Application Priority Data

Jan. 24, 2012 (JP) ................................ 2012-012228

(51) Int. Cl.
*H04N 5/225* (2006.01)
*H04N 5/228* (2006.01)

(52) U.S. Cl.
USPC ...... 348/335; 348/208.11; 348/340; 359/715; 359/740

(58) Field of Classification Search
USPC ................. 348/208.11, 211.9, 240.99, 240.1, 348/240.2, 240.3, 340
See application file for complete search history.

(56) References Cited

U.S. PATENT DOCUMENTS

| | | | | |
|---|---|---|---|---|
| 3,575,082 A | * | 4/1971 | McClune | 396/385 |
| 4,348,090 A | * | 9/1982 | Iizuka | 396/385 |
| 8,102,606 B2 | * | 1/2012 | Miyajima | 359/690 |
| 2004/0223068 A1 | * | 11/2004 | Kamo | 348/335 |
| 2013/0100323 A1 | * | 4/2013 | Abe | 348/294 |

FOREIGN PATENT DOCUMENTS

| | | |
|---|---|---|
| JP | 2007-264179 | 10/2007 |
| JP | 2008-146087 | 6/2008 |

* cited by examiner

*Primary Examiner* — Hung Lam
(74) *Attorney, Agent, or Firm* — Rader, Fishman & Grauer PLLC (57) ABSTRACT

There is provided an eyepiece optical system including a lens, a surface nearest to an observer side of the lens disposed nearest to the observer side being formed in a convex shape on the observer side, and the eyepiece optical system satisfying a conditional expression (1) |RL/DH|<1.7, where RL is a radius of curvature of the surface nearest to the observer side, and DH is a shortest distance in a radial direction from an optical axis to an edge surface of the lens nearest to the observer side.

8 Claims, 5 Drawing Sheets

EYEPIECE OPTICAL SYSTEM AND IMAGING DEVICE

BACKGROUND

The present technology relates to a technical field of an eyepiece optical system and an imaging device, and particularly to a technical field of an eyepiece optical system and an imaging device in which miniaturization in a radial direction is achieved and the occurrence of harmful light is suppressed without a rise in manufacturing cost.

Imaging devices such as digital still cameras, digital video cameras, and the like have recently spread also for home use. An eyepiece optical system used as a viewfinder for viewing a subject is generally disposed in an imaging device.

An eyepiece optical system formed so as to be miniaturized or suppress the occurrence of harmful light is known as an eyepiece optical system in related art disposed in such an imaging device (see Japanese Patent Laid-Open No. 2007-264179 (hereinafter referred to as Patent Document 1) and Japanese Patent Laid-Open No. 2008-146087 (hereinafter referred to as Patent Document 2), for example).

The eyepiece optical system described in Patent Document 1 is miniaturized in the direction of an optical axis by regulating a focal length and a principal point interval.

The eyepiece optical system described in Patent Document 2 suppresses the occurrence of harmful light by an aperture stop disposed between two lenses.

SUMMARY

However, in the eyepiece optical system described in Patent Document 1, the focal length and the principal point interval are regulated, a pupil diameter needs to be increased to ensure performance, and sufficient miniaturization is not achieved in the radial direction of lenses.

In addition, in the eyepiece optical system described in Patent Document 2, the aperture stop is disposed between the two lenses. This correspondingly increases the number of parts and the number of man-hours for assembly, thus increasing manufacturing cost. In addition, a space necessary for disposing the aperture stop increases size in the radial direction of the lenses.

Further, there is also an imaging device in which a coating in a black color (black coating) or the like is applied to the edge surface of a lens to absorb stray light reaching the edge surface and thereby prevent the stray light from being visible to an observer as harmful light. However, when a coating in a black color or the like is applied, a secondary process such as the coating and the like after the manufacturing of the lens is necessary, thus resulting in a rise in manufacturing cost.

It is accordingly desirable to overcome the above problems, and provide an eyepiece optical system and an imaging device in which miniaturization in a radial direction is achieved and the occurrence of harmful light is suppressed without a rise in manufacturing cost.

Firstly, according to an embodiment of the present technology, there is provided an eyepiece optical system including a lens, a surface nearest to an observer side of the lens disposed nearest to the observer side being formed in a convex shape on the observer side, and the eyepiece optical system satisfying a conditional expression (1) in the following:

$$|RL/DH| < 1.7 \quad (1)$$

where

RL is a radius of curvature of the surface nearest to the observer side, and

DH is a shortest distance in a radial direction from an optical axis to an edge surface of the lens nearest to the observer side.

Thus, in the eyepiece optical system, stray light that reached the edge surface of the lens disposed nearest to the observer side is totally reflected by the surface nearest to the observer side.

Secondly, in the foregoing eyepiece optical system, an air interval between the lens disposed nearest to the observer side and a lens disposed next to the lens disposed nearest to the observer side is desirably 0.5 mm or less irrespective of a distance in the radial direction from the optical axis.

When the air interval between the lens disposed nearest to the observer side and the lens disposed next to the lens disposed nearest to the observer side is 0.5 mm or less irrespective of the distance in the radial direction from the optical axis, stray light that reached the edge surface of the lens disposed next to the lens disposed nearest to the observer side is totally reflected by the surface nearest to the observer side.

Thirdly, in the foregoing eyepiece optical system, a positive lens, a negative lens, and a positive lens are desirably arranged in order from an object side to the observer side.

When the positive lens, the negative lens, and the positive lens are arranged in order from the object side to the observer side, an angle of view is widened in a state in which the radius of curvature of the surface nearest to the observer side is decreased.

Fourthly, according to an embodiment of the present technology, there is provided another eyepiece optical system including a lens, a surface nearest to an observer side of the lens disposed nearest to the observer side being formed in a convex shape on the observer side, and the eyepiece optical system satisfying a conditional expression (2) in the following:

$$|RL/KL| > 2.0 \quad (2)$$

where

RL is a radius of curvature of the surface nearest to the observer side, and

KL is a thickness of an edge surface of the lens nearest to the observer side.

Thus, in the other eyepiece optical system, stray light that reached the edge surface of the lens disposed nearest to the observer side is totally reflected by the surface nearest to the observer side.

Fifthly, in the foregoing other eyepiece optical system, an air interval between the lens disposed nearest to the observer side and a lens disposed next to the lens disposed nearest to the observer side is desirably 0.5 mm or less irrespective of a distance in a radial direction from an optical axis.

When the air interval between the lens disposed nearest to the observer side and the lens disposed next to the lens disposed nearest to the observer side is 0.5 mm or less irrespective of the distance in the radial direction from the optical axis, stray light that reached the edge surface of the lens disposed next to the lens disposed nearest to the observer side is totally reflected by the surface nearest to the observer side.

Sixthly, in the foregoing other eyepiece optical system, a positive lens, a negative lens, and a positive lens are desirably arranged in order from an object side to the observer side.

When the positive lens, the negative lens, and the positive lens are arranged in order from the object side to the observer side, an angle of view is widened in a state in which the radius of curvature of the surface nearest to the observer side is decreased.

According to an embodiment of the present technology, there is provided an imaging device including: an imaging optical system for capturing an image of a subject as an optical image; an eyepiece optical system for viewing the image of the subject; and an imaging element for converting the optical image formed by the imaging optical system into an electric signal; the eyepiece optical system including a lens, a surface nearest to an observer side of the lens disposed nearest to the observer side being formed in a convex shape on the observer side, and the eyepiece optical system satisfying a conditional expression (1) in the following:

$$|RL/DH| < 1.7 \quad (1)$$

where

RL is a radius of curvature of the surface nearest to the observer side, and

DH is a shortest distance in a radial direction from an optical axis to an edge surface of the lens nearest to the observer side.

Thus, in the imaging device, stray light that reached the edge surface of the lens disposed nearest to the observer side is totally reflected by the surface nearest to the observer side.

According to an embodiment of the present technology, there is provided another imaging device including: an imaging optical system for capturing an image of a subject as an optical image; an eyepiece optical system for viewing the image of the subject; and an imaging element for converting the optical image formed by the imaging optical system into an electric signal; the eyepiece optical system including a lens, a surface nearest to an observer side of the lens disposed nearest to the observer side being formed in a convex shape on the observer side, and the eyepiece optical system satisfying a conditional expression (2) in the following:

$$|RL/KL| > 2.0 \quad (2)$$

where

RL is a radius of curvature of the surface nearest to the observer side, and

KL is a thickness of an edge surface of the lens nearest to the observer side.

Thus, in the other imaging device, stray light that reached the edge surface of the lens disposed nearest to the observer side is totally reflected by the surface nearest to the observer side.

The eyepiece optical system and the imaging device according to the embodiments of the present technology can be miniaturized in the radial direction and suppress the occurrence of harmful light without a rise in manufacturing cost.

BRIEF DESCRIPTION OF THE DRAWINGS

FIG. 1 shows a best mode for carrying out an eyepiece optical system and an imaging device according to an embodiment of the present technology together with FIGS. 2 to 7.

DETAILED DESCRIPTION OF THE PREFERRED EMBODIMENTS

The best mode for carrying out an eyepiece optical system and an imaging device according to an embodiment of the present technology will hereinafter be described.

[Outlines of Eyepiece Optical System]

Outlines of an eyepiece optical system according to an embodiment of the present technology will first be described (with reference to FIGS. 1 to 5).

Figure 1:
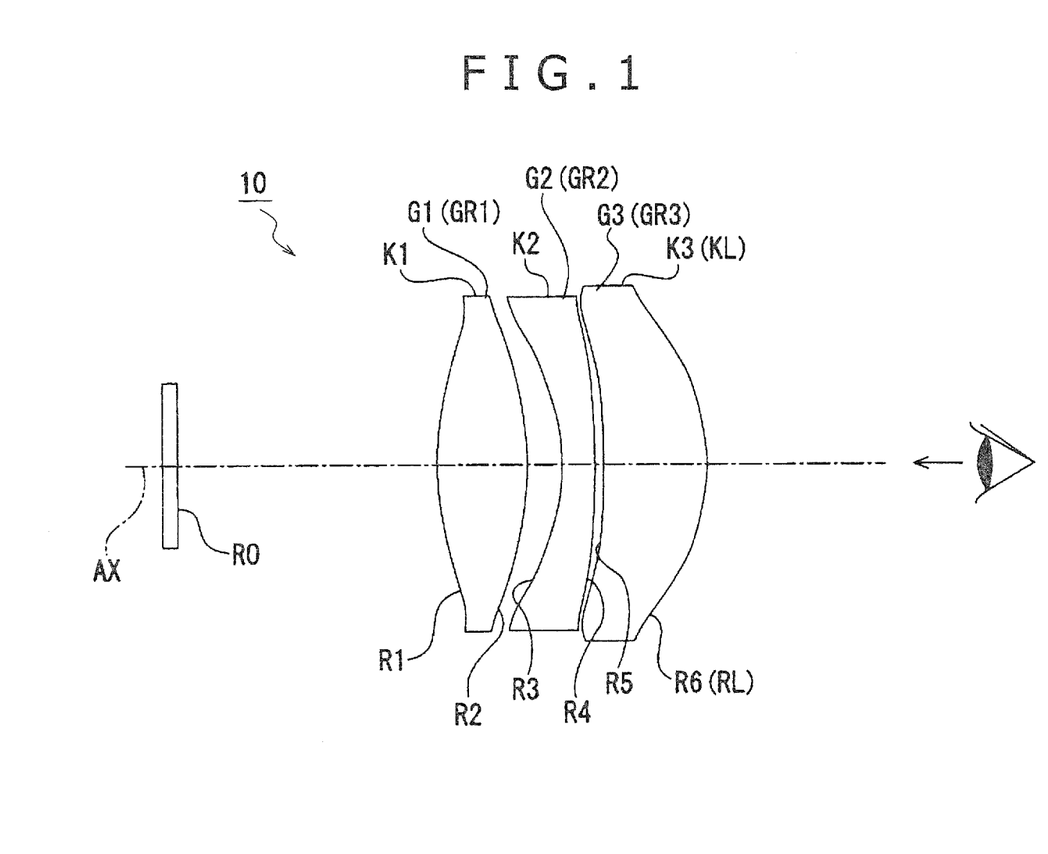
FIG. 1 is a diagram schematically showing the eyepiece optical system.

As shown in FIG. 1, an eyepiece optical system 10 has for example a first lens group GR1, a second lens group GR2, and a third lens group GR3 arranged in order from an object side to an observer side. The first lens group GR1, the second lens group GR2, and the third lens group GR3 are for example formed by a first lens G1 having positive refractive power, a second lens G2 having negative refractive power, and a third lens G3 having positive refractive power, respectively.

Incidentally, the number of lens groups of the eyepiece optical system 10 is arbitrary, and the first lens group GR1, the second lens group GR2, and the third lens group GR3 may each have two or more lenses.

The eyepiece optical system 10 has an image display surface R0 disposed on the object side of the first lens G1. The image display surface R0 displays an optical image of a subject which optical image is captured by an imaging optical system not shown in FIG. 1. An observer views the image or video displayed on the image display surface R0 via the first lens G1, the second lens G2, and the third lens G3 from the side of the third lens G3.

The outer circumferential surfaces of the first lens G1, the second lens G2, and the third lens G3 are each formed as an edge surface. The thicknesses (widths in the direction of an optical axis AX) of the edge surfaces are K1, K2, and K3, respectively.

The first lens G1 has a surface on the object side with a radius of curvature R1, and has a surface on the observer side with a radius of curvature R2. The second lens G2 has a surface on the object side with a radius of curvature R3, and has a surface on the observer side with a radius of curvature R4. The third lens G3 has a surface on the object side with a radius of curvature R5, and has a surface on the observer side with a radius of curvature R6.

Figure 2:
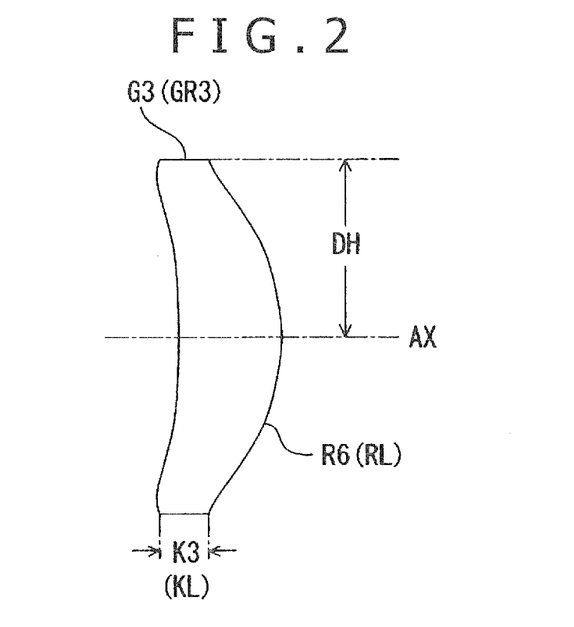
FIG. 2 is a diagram showing a third lens group.

A shortest distance in a radial direction from the optical axis AX to the edge surface K3 of the lens nearest to the observer side, that is, the third lens G3 is DH (see FIG. 2).

The eyepiece optical system according to the embodiment of the present technology includes at least one lens, the surface nearest to the observer side of the lens disposed nearest to the observer side being formed in a convex shape on the observer side, and the eyepiece optical system satisfying a conditional expression (1) in the following:

$$|RL/DH| < 1.7 \quad (1)$$

where

RL is the radius of curvature of the surface nearest to the observer side, and

DH is the shortest distance in the radial direction from the optical axis to the edge surface of the lens nearest to the observer side.

As described above, in the eyepiece optical system according to the embodiment of the present technology, the surface nearest to the observer side of the lens disposed nearest to the observer side is formed in a convex shape on the observer side, and the eyepiece optical system is formed so as to satisfy the conditional expression (1). RL in the conditional expression (1) is R6 in the example of FIG. 1.

The conditional expression (1) defines a ratio between the radius of curvature of the surface nearest to the observer side and the shortest distance in the radial direction from the optical axis to the edge surface of the lens nearest to the observer side. The conditional expression (1) represents a condition (total reflection condition) relating to the traveling direction of light that has reached the edge surface and has been reflected by the edge surface (stray light) at a time of the light reaching the surface nearest to the observer side.

When the upper limit of the conditional expression (1) is exceeded, the stray light that reached the edge surface of the lens nearest to the observer side is transmitted by the surface nearest to the observer side, and reaches the observer.

The eyepiece optical system according to the embodiment of the present technology is formed so as to satisfy the conditional expression (1). Thus, as shown in a conceptual diagram of FIG. 3, for example, the stray light that reached the edge surface K3 of the third lens group GR3 (third lens G3) is made incident on the surface nearest to the observer side of the third lens group GR3 at a large angle.

Figure 3:
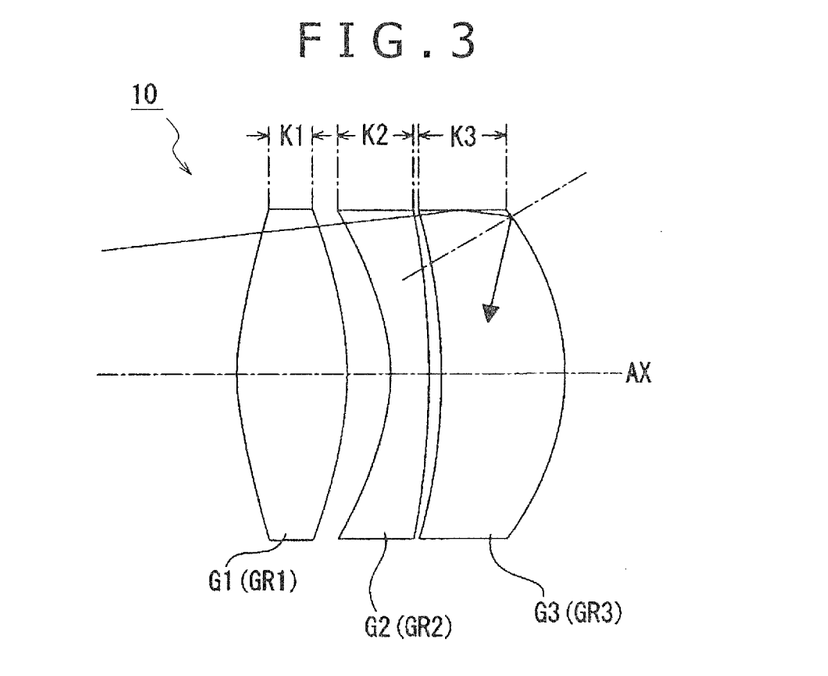
FIG. 3 is a conceptual diagram showing the traveling direction of light reflected by the edge surface of a third lens.

Therefore, the stray light is totally reflected by the surface nearest to the observer side and is not transmitted to the observer side, and the stray light does not occur as harmful light in the observer, so that excellent quality of the eyepiece optical system can be ensured.

Figure 4:
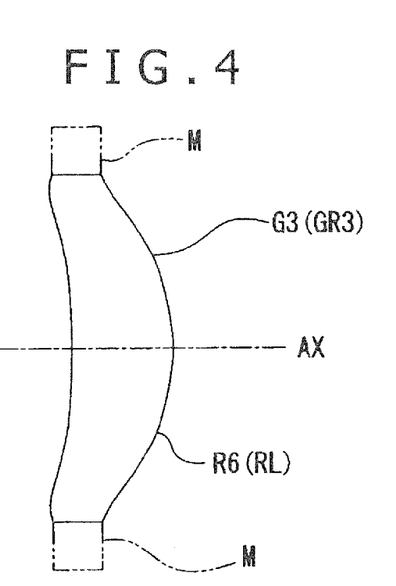
FIG. 4 is a diagram of assistance in explaining miniaturization in a radial direction of the third lens group.

In addition, in order to prevent the stray light reaching and reflected by the edge surface from being transmitted by the surface nearest to the observer side, the eyepiece optical system in the past needs to have a margin M on an outer circumferential side outside an area of passage of normal light (light viewed as the image or video displayed on the image display surface R0) in a peripheral part of the lens (see FIG. 4).

However, in the eyepiece optical system according to the embodiment of the present technology, the stray light that reached the edge surface does not reach the eye of the observer. Thus, the margin M required in the past can be reduced, and the lens can be correspondingly miniaturized in the radial direction. When miniaturization and an increase in magnification are to be achieved, in particular, the diameter of the lens disposed on the observer side is increased. Thus, satisfying the conditional expression (1) enables miniaturization and an increase in magnification to be ensured in addition to the suppression of occurrence of harmful light.

In addition, the whole of the lens, that is, up to the outer circumference of the lens can be made to be a region of passage of normal light. Therefore, a wide angle of view, for example an angle of view of 31° or more and a high eye point can both be achieved at the same time while miniaturization is ensured.

The angle of view is the angle to the optical axis of outermost light reaching the eye of the observer among light rays emitted from the eyepiece optical system to the observer.

The eye point is a distance between a protective glass disposed nearest to the observer side in the eyepiece optical system and the eye of the observer. The observer can view the image or video displayed on the image display surface at a great distance from the protective glass, and thus a high eye point can be achieved.

Further, a need for a secondary process after the manufacturing of the lens such as a coating in a black color (black coating) or the like is eliminated. It is thus possible to reduce the manufacturing cost of the lens, improve a yield, and ensure stable quality.

Incidentally, the eyepiece optical system more desirably satisfies a conditional expression (1)' in the following:

$$|RL/DH| < 1.5 \quad (1)'$$

When the eyepiece optical system satisfies the conditional expression (1)', the occurrence of harmful light is prevented, and better quality of the eyepiece optical system can be ensured.

Another eyepiece optical system according to an embodiment of the present technology includes at least a lens, a surface nearest to an observer side of the lens disposed nearest to the observer side being formed in a convex shape on the observer side, and the eyepiece optical system satisfying a conditional expression (2) in the following:

$$|RL/KL| > 2.0 \quad (2)$$

where
RL is the radius of curvature of the surface nearest to the observer side, and
KL is the thickness of an edge surface of the lens nearest to the observer side.

The conditional expression (2) expresses a relation between the radius of curvature of the surface nearest to the observer side and the thickness of the edge surface of the lens nearest to the observer side. RL and KL in the conditional expression (2) are R6 and K3, respectively, in the example of FIG. 1.

When the radius of curvature of the surface nearest to the observer side is increased beyond the upper limit of the conditional expression (2), the total reflection condition is not satisfied, and the stray light that reached the edge surface is transmitted by the surface nearest to the observer side and reaches the observer.

On the other hand, also when the thickness of the edge surface of the lens nearest to the observer side is increased, there occurs a region in which the total reflection condition is not satisfied, and the stray light that reached the edge surface is transmitted by the surface nearest to the observer side and reaches the observer.

Therefore, when the eyepiece optical system satisfies the conditional expression (2), as shown in the conceptual diagram of FIG. 3, for example, the stray light that reached the edge surface K3 of the third lens group GR3 (third lens G3) is made incident on the surface nearest to the observer side of the third lens group GR3 at a large angle.

Therefore, the stray light is totally reflected by the surface nearest to the observer side and is not transmitted to the observer side, and the stray light does not occur as harmful light in the observer, so that excellent quality of the eyepiece optical system can be ensured.

In addition, in order to prevent the stray light reaching and reflected by the edge surface from being transmitted by the surface nearest to the observer side, the eyepiece optical system in the past needs to have a margin M on an outer circumferential side outside an area of passage of normal light (light viewed as the image or video displayed on the image display surface R0) in a peripheral part of the lens (see FIG. 4).

However, in the other eyepiece optical system according to the embodiment of the present technology, the stray light that reached the edge surface does not reach the eye of the observer. Thus, the margin M required in the past can be reduced, and the lens can be correspondingly miniaturized in the radial direction. When miniaturization and an increase in magnification are to be achieved, in particular, the diameter of the lens disposed on the observer side is increased. Thus, satisfying the conditional expression (2) enables miniaturization and an increase in magnification to be ensured in addition to the suppression of occurrence of harmful light.

In addition, the whole of the lens, that is, up to the outer circumference of the lens can be made to be a region of passage of normal light. Therefore, a wide angle of view, for example an angle of view of 31° or more and a high eye point can both be achieved at the same time while miniaturization is ensured.

The angle of view is the angle to the optical axis of outermost light reaching the eye of the observer among light rays emitted from the eyepiece optical system to the observer.

The eye point is a distance between a protective glass disposed nearest to the observer side in the eyepiece optical system and the eye of the observer. The observer can view the image or video displayed on the image display surface at a great distance from the protective glass, and thus a high eye point can be achieved.

Further, a need for a secondary process after the manufacturing of the lens such as a coating in a black color (black coating) or the like is eliminated. It is thus possible to reduce the manufacturing cost of the lens, improve a yield, and ensure stable quality.

Incidentally, the eyepiece optical system more desirably satisfies a conditional expression (2)' in the following:

$$|RL/KL|>2.5 \quad (2)'$$

When the eyepiece optical system satisfies the conditional expression (2)', the occurrence of harmful light is prevented, and better quality of the eyepiece optical system can be ensured.

In the eyepiece optical system according to one embodiment of the present technology, an air interval between the lens disposed nearest to the observer side and the lens disposed next to the lens disposed nearest to the observer side is desirably 0.5 mm or less irrespective of a distance in the radial direction from the optical axis.

In the example of FIG. 1 and FIG. 2, the lens disposed nearest to the observer side is the third lens G3, and the lens disposed next to the lens disposed nearest to the observer side is the second lens G2.

Figure 5:
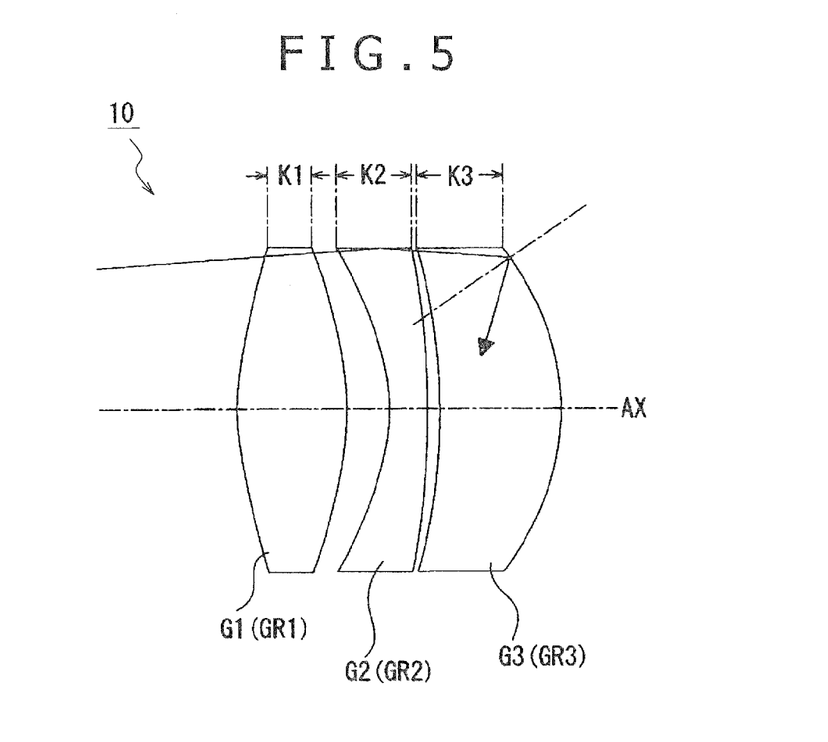
FIG. 5 is a conceptual diagram showing the traveling direction of light reflected by the edge surface of a second lens.

When the air interval between the lens disposed nearest to the observer side and the lens disposed next to the lens disposed nearest to the observer side is 0.5 mm or less irrespective of the distance in the radial direction from the optical axis, as described above, stray light that has reached the edge surface K2 of the second lens group GR2 (second lens G2) and has been reflected by the edge surface K2 is totally reflected by the surface nearest to the observer side, and does not reach the observer, as shown conceptually in FIG. 5.

Therefore, the stray light does not occur as harmful light in the observer, so that excellent quality of the eyepiece optical system can be ensured.

In addition, the margin M of the second lens G2 can be reduced, and the lens can be correspondingly miniaturized in the radial direction.

Incidentally, in the eyepiece optical system, an air interval between the lens disposed nearest to the observer side and the lens disposed next to the lens disposed nearest to the observer side is more desirably 0.2 mm or less irrespective of a distance in the radial direction from the optical axis.

When the air interval between the lens disposed nearest to the observer side and the lens disposed next to the lens disposed nearest to the observer side is 0.2 mm or less irrespective of the distance in the radial direction from the optical axis, the occurrence of harmful light is prevented, and better quality of the eyepiece optical system can be ensured.

In the eyepiece optical system according to one embodiment of the present technology, a positive lens, a negative lens, and a positive lens are desirably arranged in order from the object side to the observer side.

Such a configuration of the positive lens, the negative lens, and the positive lens in order from the object side to the observer side can ensure a wide angle of view in a state in which the radius of curvature RL of the surface nearest to the observer side in the conditional expression (1) and the conditional expression (2) is decreased.

[Numerical Examples of Eyepiece Optical System]

Concrete embodiments of an eyepiece optical system according to the present technology and numerical examples in which concrete numerical values are applied to the embodiments will hereinafter be described with reference to drawings and tables.

Incidentally, the meanings and the like of symbols shown in the tables and description in the following are as follows.

"Si" denotes the surface number of an ith surface counted from the object side to the observer side. "Ri" denotes the paraxial radius of curvature of the ith surface. "Di" denotes an axial surface interval (the thickness of the center of a lens or an air interval) between the ith surface and an (i+1)th surface. "Ni" denotes the index of refraction at a d-line (λ=587.6 nm) of a lens or the like beginning at the ith surface. "vi" denotes the Abbe number at the d-line of the lens or the like beginning at the ith surface.

"ASP" in relation to the "surface number" denotes that the surface in question is an aspheric surface.

"κ" denotes a conic constant. "A4," "A6," "A8," "A10," "A12," and "A14" denote aspheric coefficients of a fourth order, a sixth order, an eighth order, a tenth order, a 12th order, and a 14th order, respectively.

Incidentally, in the tables showing the following aspheric coefficients, "E-n" denotes an exponential representation having a base of 10, that is, "10 to a negative nth power." For example, "0.12345E-05" denotes "0.12345×(10 to a negative fifth power)."

The eyepiece optical systems used in the respective embodiments include lenses having lens surfaces formed as aspheric surfaces. Letting "x" be a distance (amount of sag) from the vertex of a lens surface in the direction of the optical axis, "y" be a height (image height) in a direction perpendicular to the direction of the optical axis, "c" be a paraxial curvature (reciprocal of a radius of curvature) at the vertex of the lens, "κ" be a conic constant, and "A4," "A6," "A8," "A10," "A12," and "A14" be aspheric coefficients of a fourth order, a sixth order, an eighth order, a tenth order, a 12th order, and a 14th order, respectively, the aspheric shape is defined by the following Equation 1.

$$x = \frac{cy^2}{1+\{1-(1+\kappa)c^2 y^2\}^{1/2}} + A4y^4 + A6y^6 + A8y^8 + A10y^{10} + A12y^{12} + A14y^{14} \quad [\text{Equation 1}]$$

<First Embodiment>

Figure 6:
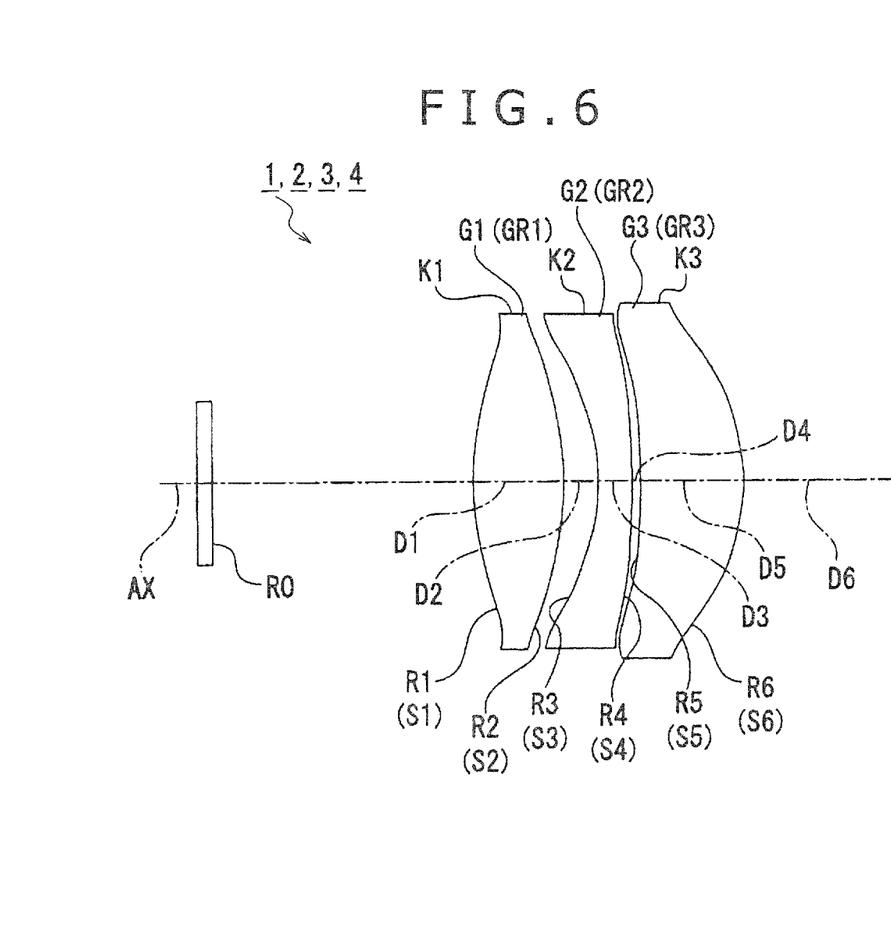
FIG. 6 is a diagram showing a lens configuration of an embodiment of an eyepiece optical system.

FIG. 6 shows a lens configuration of an eyepiece optical system 1 in a first embodiment of the present technology.

The eyepiece optical system 1 is formed by arranging a first lens group GR1 having positive refractive power, a second lens group GR2 having negative refractive power, and a third lens group GR3 having positive refractive power in order from an object side to an observer side.

The positions of the first lens group GR1, the second lens group GR2, and the third lens group GR3 are fixed at all times. The first lens group GR1 is formed by a first lens G1 having positive refractive power. The second lens group GR2 is formed by a second lens G2 having negative refractive power. The third lens group GR3 is formed by a third lens G3 having positive refractive power.

Table 1 shows the lens data of a first numerical example in which concrete numerical values are applied to the eyepiece optical system 1 in the first embodiment.

TABLE 1

| Si | Ri | Di | Ni | vi |
|---|---|---|---|---|
| 1(ASP) | 14.173 | 4.400 | 1.531 | 56.0 |
| 2(ASP) | −17.954 | 1.800 | | |
| 3(ASP) | −9.227 | 1.600 | 1.632 | 23.2 |
| 4(ASP) | −37.740 | 0.500 | | |
| 5(ASP) | −40.767 | 5.000 | 1.531 | 56.0 |
| 6(ASP) | −10.166 | 16.000 | | |

In the eyepiece optical system 1, both surfaces (a first surface and a second surface) of the positive lens G1 of the first lens group GR1, both surfaces (a third surface and a fourth surface) of the negative lens G2 of the second lens group GR2, and both surfaces (a fifth surface and a sixth surface) of the positive lens G3 of the third lens group GR3 are formed as aspheric surfaces. Table 2 shows the aspheric coefficients A4, A6, A8, A10, A12, and A14 of the fourth order, the sixth order, the eighth order, the tenth order, the 12th order, and the 14th order of the aspheric surfaces in the first numerical example together with the conic constant κ.

TABLE 2

| Si | κ | A4 | A6 | A8 | A10 | A12 | A14 |
|---|---|---|---|---|---|---|---|
| 1 | 0 | −1.232E−04 | −1.199E−06 | −1.501E−08 | 2.335E−10 | 5.616E−12 | −1.268E−13 |
| 2 | 0 | −4.241E−05 | −5.716E−07 | −7.223E−09 | 8.362E−10 | −7.306E−12 | 8.854E−15 |
| 3 | 0 | 2.754E−04 | −5.150E−06 | 9.968E−08 | −2.124E−10 | −2.225E−11 | 2.322E−13 |
| 4 | 0 | −3.122E−05 | 1.530E−06 | −3.199E−08 | 5.465E−10 | −6.521E−12 | 4.033E−14 |
| 5 | 0 | −3.591E−04 | 8.390E−06 | −2.470E−07 | 5.360E−09 | −4.714E−11 | 1.494E−13 |
| 6 | 0 | −1.151E−05 | −1.579E−06 | 2.666E−08 | −2.341E−10 | 2.516E−12 | 6.185E−16 |

<Second Embodiment>

FIG. 6 shows a lens configuration of an eyepiece optical system 2 in a second embodiment of the present technology.

The eyepiece optical system 2 is formed by arranging a first lens group GR1 having positive refractive power, a second lens group GR2 having negative refractive power, and a third lens group GR3 having positive refractive power in order from an object side to an observer side.

The positions of the first lens group GR1, the second lens group GR2, and the third lens group GR3 are fixed at all times. The first lens group GR1 is formed by a first lens G1 having positive refractive power. The second lens group GR2 is formed by a second lens G2 having negative refractive power. The third lens group GR3 is formed by a third lens G3 having positive refractive power.

Table 3 shows the lens data of a second numerical example in which concrete numerical values are applied to the eyepiece optical system 2 in the second embodiment.

TABLE 3

| Si | Ri | Di | Ni | vi |
|---|---|---|---|---|
| 1(ASP) | 14.711 | 4.600 | 1.531 | 56.0 |
| 2(ASP) | −15.411 | 1.800 | | |
| 3(ASP) | −8.130 | 1.600 | 1.620 | 25.0 |
| 4(ASP) | −31.900 | 0.400 | | |
| 5(ASP) | −38.892 | 5.000 | 1.531 | 56.0 |
| 6(ASP) | −9.958 | 16.000 | | |

In the eyepiece optical system 2, both surfaces (a first surface and a second surface) of the positive lens G1 of the first lens group GR1, both surfaces (a third surface and a fourth surface) of the negative lens G2 of the second lens group GR2, and both surfaces (a fifth surface and a sixth surface) of the positive lens G3 of the third lens group GR3 are formed as aspheric surfaces. Table 4 shows the aspheric coefficients A4, A6, A8, A10, A12, and A14 of the fourth order, the sixth order, the eighth order, the tenth order, the 12th order, and the 14th order of the aspheric surfaces in the second numerical example together with the conic constant κ.

TABLE 4

| Si | κ | A4 | A6 | A8 | A10 | A12 | A14 |
|---|---|---|---|---|---|---|---|
| 1 | 0 | −1.118E−04 | −9.742E−07 | −2.083E−08 | 1.667E−10 | 5.699E−12 | −1.349E−13 |
| 2 | 0 | −4.311E−05 | −6.242E−07 | −8.084E−09 | 7.321E−10 | −8.946E−12 | 2.881E−14 |
| 3 | 0 | 2.737E−04 | −5.221E−06 | 9.828E−08 | −2.109E−10 | −2.237E−11 | 2.362E−13 |
| 4 | 0 | −3.313E−05 | 1.439E−06 | −3.301E−08 | 5.408E−10 | −6.462E−12 | 4.243E−14 |
| 5 | 0 | −3.616E−04 | 8.370E−06 | −2.476E−07 | 5.361E−09 | −4.696E−11 | 1.500E−13 |
| 6 | 0 | −6.854E−06 | −1.580E−06 | 2.726E−08 | −2.159E−10 | 2.699E−12 | −9.477E−16 |

<Third Embodiment>

FIG. 6 shows a lens configuration of an eyepiece optical system 3 in a third embodiment of the present technology.

The eyepiece optical system 3 is formed by arranging a first lens group GR1 having positive refractive power, a second lens group GR2 having negative refractive power, and a third lens group GR3 having positive refractive power in order from an object side to an observer side.

The positions of the first lens group GR1, the second lens group GR2, and the third lens group GR3 are fixed at all times. The first lens group GR1 is formed by a first lens G1 having positive refractive power. The second lens group GR2 is formed by a second lens G2 having negative refractive power. The third lens group GR3 is formed by a third lens C3 having positive refractive power.

Table 5 shows the lens data of a third numerical example in which concrete numerical values are applied to the eyepiece optical system 3 in the third embodiment.

TABLE 5

| Si | Ri | Di | Ni | vi |
|---|---|---|---|---|
| 1(ASP) | 15.024 | 4.600 | 1.531 | 56.0 |
| 2(ASP) | −14.890 | 1.800 | | |
| 3(ASP) | −8.109 | 1.600 | 1.620 | 25.0 |
| 4(ASP) | −32.291 | 0.500 | | |
| 5(ASP) | −42.768 | 5.000 | 1.531 | 56.0 |
| 6(ASP) | −10.080 | 16.000 | | |

In the eyepiece optical system 3, both surfaces (a first surface and a second surface) of the positive lens G1 of the first lens group GR1, both surfaces (a third surface and a fourth surface) of the negative lens G2 of the second lens group GR2, and both surfaces (a fifth surface and a sixth surface) of the positive lens G3 of the third lens group GR3 are formed as aspheric surfaces. Table 6 shows the aspheric coefficients A4, A6, A8, A10, A12, and A14 of the fourth order, the sixth order, the eighth order, the tenth order, the 12th order, and the 14th order of the aspheric surfaces in the third numerical example together with the conic constant κ.

TABLE 6

| Si | κ | A4 | A6 | A8 | A10 | A12 | A14 |
|---|---|---|---|---|---|---|---|
| 1 | 0 | −1.143E−04 | −1.002E−06 | −2.079E−08 | 1.611E−10 | 5.450E−12 | −1.423E−13 |
| 2 | 0 | −4.241E−05 | −5.926E−07 | −9.418E−09 | 7.064E−10 | −9.206E−12 | 2.781E−14 |
| 3 | 0 | 2.743E−04 | −5.238E−06 | 9.878E−08 | −2.134E−10 | −2.247E−11 | 2.402E−13 |
| 4 | 0 | −3.213E−05 | 1.461E−06 | −3.326E−08 | 5.377E−10 | −6.455E−12 | 4.308E−13 |
| 5 | 0 | −3.613E−04 | 8.347E−06 | −2.476E−07 | 5.358E−09 | −4.699E−11 | 1.503E−13 |
| 6 | 0 | −9.712E−06 | −1.567E−06 | 2.718E−08 | −2.118E−10 | 2.761E−12 | −1.206E−15 |

<Fourth Embodiment>

FIG. 6 shows a lens configuration of an eyepiece optical system 4 in a fourth embodiment of the present technology.

The eyepiece optical system 4 is formed by arranging a first lens group GR1 having positive refractive power, a second lens group GR2 having negative refractive power, and a third lens group GR3 having positive refractive power in order from an object side to an observer side.

The positions of the first lens group GR1, the second lens group GR2, and the third lens group GR3 are fixed at all times. The first lens group GR1 is formed by a first lens G1 having positive refractive power. The second lens group GR2 is formed by a second lens G2 having negative refractive power. The third lens group GR3 is formed by a third lens G3 having positive refractive power.

Table 7 shows the lens data of a fourth numerical example in which concrete numerical values are applied to the eyepiece optical system 4 in the fourth embodiment.

TABLE 7

| Si | Ri | Di | Ni | vi |
|---|---|---|---|---|
| 1(ASP) | 14.403 | 4.600 | 1.531 | 56.0 |
| 2(ASP) | −15.207 | 1.800 | | |
| 3(ASP) | −8.039 | 1.600 | 1.614 | 26.0 |
| 4(ASP) | −39.375 | 0.500 | | |
| 5(ASP) | −62.254 | 5.000 | 1.531 | 56.0 |
| 6(ASP) | −10.215 | 16.000 | | |

In the eyepiece optical system 4, both surfaces (a first surface and a second surface) of the positive lens G1 of the first lens group GR1, both surfaces (a third surface and a fourth surface) of the negative lens G2 of the second lens group GR2, and both surfaces (a fifth surface and a sixth surface) of the positive lens G3 of the third lens group GR3 are formed as aspheric surfaces. Table 8 shows the aspheric coefficients A4, A6, A8, A10, A12, and A14 of the fourth order, the sixth order, the eighth order, the tenth order, the 12th order, and the 14th order of the aspheric surfaces in the fourth numerical example together with the conic constant κ.

TABLE 8

| Si | κ | A4 | A6 | A8 | A10 | A12 | A14 |
|---|---|---|---|---|---|---|---|
| 1 | 0 | −1.134E−04 | −9.185E−07 | −2.076E−08 | 1.134E−10 | 3.990E−12 | −1.817E−13 |
| 2 | 0 | −5.185E−05 | −6.766E−07 | −1.221E−08 | 6.379E−10 | −1.075E−11 | 7.055E−15 |
| 3 | 0 | 2.771E−04 | −5.360E−06 | 9.648E−08 | −2.456E−10 | −2.255E−11 | 2.475E−13 |
| 4 | 0 | −3.355E−05 | 1.445E−06 | −3.341E−08 | 5.439E−10 | −6.398E−12 | 4.035E−14 |
| 5 | 0 | −3.619E−04 | 8.294E−06 | −2.483E−07 | 5.347E−09 | −4.706E−11 | 1.523E−13 |
| 6 | 0 | 4.236E−08 | −1.591E−06 | 2.630E−08 | −2.045E−10 | 2.928E−12 | −1.486E−15 |

[Values in Conditional Expressions in Eyepiece Optical Systems]

Values in the conditional expressions in the eyepiece optical systems according to the embodiments of the present technology will be described in the following.

Table 9 shows values in the foregoing conditional expression (1) and the foregoing conditional expression (2) in the eyepiece optical systems 1 to 4.

TABLE 9

|  |  | Eyepiece Optical System 1 | Eyepiece Optical System 2 | Eyepiece Optical System 3 | Eyepiece Optical System 4 |
| --- | --- | --- | --- | --- | --- |
|  | RL | −10.166 | −9.958 | −10.080 | −10.215 |
|  | DH | 6.850 | 7.000 | 6.700 | 6.850 |
| Conditional Expression (1) | |RL/DH| | 1.484 | 1.423 | 1.504 | 1.491 |
|  | KL | 3.524 | 3.350 | 3.800 | 3.524 |
| Conditional Expression (2) | |RL/KL| | 2.885 | 2.973 | 2.653 | 2.899 |

As is clear from Table 9, the eyepiece optical systems 1 to 4 satisfy the conditional expression (1) and the conditional expression (2).

[Outlines of Imaging Device]

An imaging device according to an embodiment of the present technology includes: an imaging optical system for capturing an image of a subject as an optical image; an eyepiece optical system for viewing the image of the subject; and an imaging element for converting the optical image formed by the imaging optical system into an electric signal; the eyepiece optical system including at least one lens, a surface nearest to an observer side of the lens disposed nearest to the observer side being formed in a convex shape on the observer side, and the eyepiece optical system satisfying a conditional expression (1) in the following:

$$|RL/DH|<1.7 \quad (1)$$

where

RL is a radius of curvature of the surface nearest to the observer side, and

DH is a shortest distance in a radial direction from an optical axis to an edge surface of the lens nearest to the observer side.

As described above, in the imaging device according to the embodiment of the present technology, the surface nearest to the observer side of the lens disposed nearest to the observer side is formed in a convex shape on the observer side, and the eyepiece optical system is formed so as to satisfy the conditional expression (1).

The conditional expression (1) defines a ratio between the radius of curvature of the surface nearest to the observer side and the shortest distance in the radial direction from the optical axis to the edge surface of the lens nearest to the observer side. The conditional expression (1) represents a condition (total reflection condition) relating to the traveling direction of light that has reached the edge surface and has been reflected by the edge surface (stray light) at a time of the light reaching the surface nearest to the observer side.

When the upper limit of the conditional expression (1) is exceeded, the stray light that reached the edge surface of the lens nearest to the observer side is transmitted by the surface nearest to the observer side, and reaches the observer.

In the imaging device according to the embodiment of the present technology, the eyepiece optical system is formed so as to satisfy the conditional expression (1). Thus, as shown in the conceptual diagram of FIG. 3, for example, the stray light that reached the edge surface K3 of the third lens group GR3 (third lens G3) is made incident on the surface nearest to the observer side of the third lens group GR3 at a large angle.

Therefore, the stray light is totally reflected by the surface nearest to the observer side and is not transmitted to the observer side, and the stray light does not occur as harmful light in the observer, so that excellent quality of the eyepiece optical system can be ensured.

In addition, in the eyepiece optical system of the imaging device according to the embodiment of the present technology, the stray light that reached the edge surface does not reach the eye of the observer. Thus, the margin M required in the past can be reduced, and the lens can be correspondingly miniaturized in the radial direction. When miniaturization and an increase in magnification are to be achieved, in particular, the diameter of the lens disposed on the observer side is increased. Thus, satisfying the conditional expression (1) enables miniaturization and an increase in magnification to be ensured in addition to the suppression of occurrence of harmful light.

Further, the whole of the lens, that is, up to the outer circumference of the lens can be made to be a region of passage of normal light. Therefore, a wide angle of view, for example an angle of view of 31° or more and a high eye point can both be achieved at the same time while miniaturization is ensured.

Further, a need for a secondary process after the manufacturing of the lens such as a coating in a black color (black coating) or the like is eliminated. It is thus possible to reduce the manufacturing cost of the lens, improve a yield, and ensure stable quality.

Another imaging device according to an embodiment of the present technology includes: an imaging optical system for capturing an image of a subject as an optical image; an eyepiece optical system for viewing the image of the subject; and an imaging element for converting the optical image formed by the imaging optical system into an electric signal; the eyepiece optical system including at least one lens, a surface nearest to an observer side of the lens disposed nearest to the observer side being formed in a convex shape on the observer side, and the eyepiece optical system satisfying a conditional expression (2) in the following:

$$|RL/KL|>2.0 \quad (2)$$

where

RL is a radius of curvature of the surface nearest to the observer side, and

KL is a thickness of an edge surface of the lens nearest to the observer side.

The conditional expression (2) expresses a relation between the radius of curvature of the surface nearest to the observer side and the thickness of the edge surface of the lens nearest to the observer side.

When the radius of curvature of the surface nearest to the observer side is increased beyond the upper limit of the conditional expression (2), the total reflection condition is not satisfied, and the stray light that reached the edge surface is transmitted by the surface nearest to the observer side and reaches the observer.

On the other hand, also when the thickness of the edge surface of the lens nearest to the observer side is increased, there occurs a region in which the total reflection condition is not satisfied, and the stray light that reached the edge surface is transmitted by the surface nearest to the observer side and reaches the observer.

When the eyepiece optical system satisfies the conditional expression (2), as shown in the conceptual diagram of FIG. 3, for example, the stray light that reached the edge surface K3 of the third lens group GR3 (third lens G3) is made incident on the surface nearest to the observer side of the third lens group GR3 at a large angle.

Therefore, the stray light is totally reflected by the surface nearest to the observer side and is not transmitted to the observer side, and the stray light does not occur as harmful light in the observer, so that excellent quality of the eyepiece optical system can be ensured.

In addition, in the eyepiece optical system of the other imaging device according to the embodiment of the present technology, the stray light that reached the edge surface does not reach the eye of the observer. Thus, the margin M required in the past can be reduced, and the lens can be correspondingly miniaturized in the radial direction. When miniaturization and an increase in magnification are to be achieved, in particular, the diameter of the lens disposed on the observer side is increased. Thus, satisfying the conditional expression (2) enables miniaturization and an increase in magnification to be ensured in addition to the suppression of occurrence of harmful light.

Further, the whole of the lens, that is, up to the outer circumference of the lens can be made to be a region of passage of normal light. Therefore, a wide angle of view, for example an angle of view of 31° or more and a high eye point can both be achieved at the same time while miniaturization is ensured.

Further, a need for a secondary process after the manufacturing of the lens such as a coating in a black color (black coating) or the like is eliminated. It is thus possible to reduce the manufacturing cost of the lens, improve a yield, and ensure stable quality.

[One Embodiment of Imaging Device]

Figure 7:
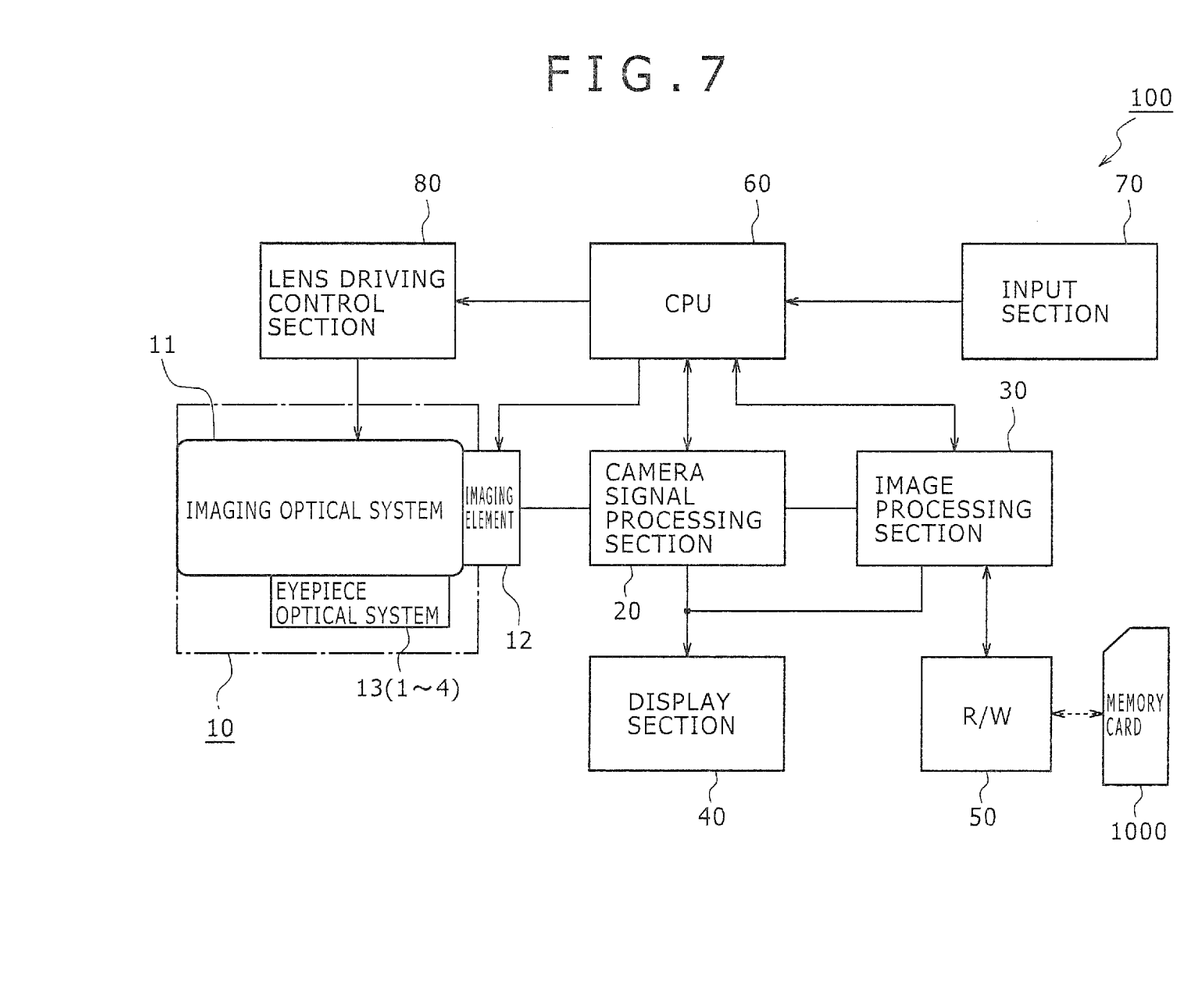
FIG. 7 is a block diagram showing an example of an imaging device.

FIG. 7 is a block diagram of a digital still camera in accordance with one embodiment of an imaging device according to the present technology.

The imaging device (digital still camera) 100 includes a camera block 10 for performing an imaging function; a camera signal processing section 20 for applying signal processing such as analog-to-digital conversion and the like to a photographed image signal; and an image processing section 30 for applying recording and reproduction processing to the image signal. The imaging device 100 also includes: a display section 40 such as an LCD (Liquid Crystal Display) or the like for displaying a photographed image and the like; an R/W (reader/writer) 50 for writing and reading the image signal to and from a memory card 1000; a CPU (Central Processing Unit) 60 for controlling the whole of the imaging device; an input section 70 composed of various switches and the like, on which input section necessary operations are performed by a user; and a lens driving control section 80 for controlling the driving of lenses disposed in the camera block 10.

The camera block 10 includes an imaging optical system 11, an imaging element 12 such as a CCD (Charge Coupled Device) sensor, a CMOS (Complementary Metal-Oxide Semiconductor) sensor, or the like, and an eyepiece optical system 13 (eyepiece optical system 10 to which the present technology is applied).

The camera signal processing section 20 performs various kinds of signal processing such as the conversion of an output signal from the imaging element 12 into a digital signal, noise removal, image quality correction, conversion into a luminance signal and color-difference signals, and the like.

The image processing section 30 performs compression coding and decompression decoding processing on the image signal and conversion processing for data specifications such as resolution and the like on the basis of a predetermined image data format.

The display section 40 has a function of displaying a state of operation on the input section 70 by the user and various kinds of data such as a photographed image and the like.

The R/W 50 writes the image data coded by the image processing section 30 to the memory card 1000 and reads the image data recorded in the memory card 1000.

The CPU 60 functions as a control processing section for controlling each circuit block provided to the imaging device 100, and controls each circuit block on the basis of an instruction input signal from the input section 70 and the like.

The input section 70 is for example formed by a shutter release button for performing shutter operation, a selecting switch for selecting an operation mode, and the like. The input section 70 outputs an instruction input signal corresponding to an operation by the user to the CPU 60.

The lens driving control section 80 controls a motor and the like not shown in the figures for driving each lens of the imaging optical system 11 on the basis of a control signal from the CPU 60.

The memory card 1000 is for example a semiconductor memory detachable from a slot connected to the R/W 50.

Operation in the imaging device 100 will be described in the following.

In a photographing standby state, under control of the CPU 60, an image signal taken in the camera block 10 is output to the display section 40 via the camera signal processing section 20, and displayed as a camera-through image. In addition, when an instruction input signal for zooming is input from the input section 70, the CPU 60 outputs a control signal to the lens driving control section 80, and a predetermined lens in the imaging optical system 11 is moved on the basis of control of the lens driving control section 80.

When a shutter not shown in the figures of the camera block 10 is operated by an instruction input signal from the input section 70, a photographed image signal is output from the camera signal processing section 20 to the image processing section 30, subjected to compression coding processing, and converted into digital data in a predetermined data format. The converted data is output to the R/W 50, and written to the memory card 1000.

Focusing is for example performed by moving a predetermined lens in the imaging optical system 11 by the lens driving control section 80 on the basis of a control signal from the CPU 60 when the shutter release button of the input section 70 is pressed halfway down or pressed all the way down for recording (photographing).

When image data recorded in the memory card 1000 is to be reproduced, the predetermined image data is read from the memory card 1000 by the R/W 50 according to an operation on the input section 70, and subjected to decompression decoding processing by the image processing section 30. A reproduced image signal is then output to the display section 40, so that a reproduced image is displayed.

Incidentally, in the foregoing embodiment, an example in which the imaging device is applied to a digital still camera has been illustrated. However, the scope of application of the imaging device is not limited to a digital still camera. The imaging device is widely applicable as a camera section of a digital input-output device such as a digital video camera, a portable telephone including a camera, a PDA (Personal Digital Assistant) including a camera, or the like.

[Others]

A lens substantially having no lens power may be disposed in an eyepiece optical system according to an embodiment of the present technology and an imaging device according to an embodiment of the present technology, and such a lens may be disposed in addition to a first to a third lens group. In such a case, the eyepiece optical system according to the embodiment of the present technology and the imaging device according to the embodiment of the present technology may be substantially formed by four lens groups or more including the lens disposed in addition to the first to third lens groups.

[Present Technology]

The present technology can also adopt the following constitutions.

<1> An eyepiece optical system including
a lens,
a surface nearest to an observer side of the lens disposed nearest to the observer side being formed in a convex shape on the observer side, and
the eyepiece optical system satisfying a conditional expression (1) in the following:

$$|RL/DH|<1.7 \qquad (1)$$

where
RL is a radius of curvature of the surface nearest to the observer side, and
DH is a shortest distance in a radial direction from an optical axis to an edge surface of the lens nearest to the observer side.

<2> An eyepiece optical system including
a lens,
a surface nearest to an observer side of the lens disposed nearest to the observer side being formed in a convex shape on the observer side, and
the eyepiece optical system satisfying a conditional expression (2) in the following:

$$|RL/KL|>2.0 \qquad (2)$$

where
RL is a radius of curvature of the surface nearest to the observer side, and
KL is a thickness of an edge surface of the lens nearest to the observer side.

<3> The eyepiece optical system according to the above <1>,
wherein an air interval between the lens disposed nearest to the observer side and a lens disposed next to the lens disposed nearest to the observer side is 0.5 mm or less irrespective of a distance in the radial direction from the optical axis.

<4> The eyepiece optical system according to the above <2>,
wherein an air interval between the lens disposed nearest to the observer side and a lens disposed next to the lens disposed nearest to the observer side is 0.5 mm or less irrespective of a distance in a radial direction from an optical axis.

<5> The eyepiece optical system according to the above <1> or the above <3>,
wherein a positive lens, a negative lens, and a positive lens are arranged in order from an object side to the observer side.

<6> The eyepiece optical system according to the above <2> or the above <4>,
wherein a positive lens, a negative lens, and a positive lens are arranged in order from an object side to the observer side.

<7> An imaging device including:
an imaging optical system for capturing an image of a subject as an optical image;
an eyepiece optical system for viewing the image of the subject; and
an imaging element for converting the optical image formed by the imaging optical system into an electric signal;
the eyepiece optical system including a lens,
a surface nearest to an observer side of the lens disposed nearest to the observer side being formed in a convex shape on the observer side, and
the eyepiece optical system satisfying a conditional expression (1) in the following:

$$|RL/DH|<1.7 \qquad (1)$$

where
RL is a radius of curvature of the surface nearest to the observer side, and
DH is a shortest distance in a radial direction from an optical axis to an edge surface of the lens nearest to the observer side.

<8> An imaging device including:
an imaging optical system for capturing an image of a subject as an optical image;
an eyepiece optical system for viewing the image of the subject; and
an imaging element for converting the optical image formed by the imaging optical system into an electric signal;
the eyepiece optical system including a lens,
a surface nearest to an observer side of the lens disposed nearest to the observer side being formed in a convex shape on the observer side, and
the eyepiece optical system satisfying a conditional expression (2) in the following:

$$|RL/KL|>2.0 \qquad (2)$$

where
RL is a radius of curvature of the surface nearest to the observer side, and
KL is a thickness of an edge surface of the lens nearest to the observer side.

<9> The eyepiece optical system according to any one of the above <1> to <6> or the imaging device according to the above <7> or the above <8>,
wherein a lens substantially having no lens power is further disposed.

The shapes and numerical values of the respective parts shown in each of the embodiments described above are each a mere example of embodiment for carrying out the present technology. The technical scope of the present technology should not be construed as limited by these shapes and numerical values.

The present disclosure contains subject matter related to that disclosed in Japanese Priority Patent Application JP 2012-012228 filed in the Japan Patent Office on Jan. 24, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An eyepiece optical system comprising
a lens,
a surface nearest to an observer side of the lens disposed nearest to the observer side being formed in a convex shape on the observer side, and
the eyepiece optical system satisfying a conditional expression (1) in the following:

$$|RL/DH|<1.7 \qquad (1)$$

where
RL is a radius of curvature of the surface nearest to the observer side, and
DH is a shortest distance in a radial direction from an optical axis to an edge surface of the lens nearest to the observer side.

2. The eyepiece optical system according to claim 1,
wherein an air interval between the lens disposed nearest to the observer side and a lens disposed next to the lens disposed nearest to the observer side is 0.5 mm or less irrespective of a distance in the radial direction from the optical axis.

3. The eyepiece optical system according to claim 1, wherein a positive lens, a negative lens, and a positive lens are arranged in order from an object side to the observer side.

4. An eyepiece optical system comprising
a lens,
a surface nearest to an observer side of the lens disposed nearest to the observer side being formed in a convex shape on the observer side, and
the eyepiece optical system satisfying a conditional expression (2) in the following:

$$|RL/KL|>2.0 \qquad (2)$$

where
RL is a radius of curvature of the surface nearest to the observer side, and
KL is a thickness of an edge surface of the lens nearest to the observer side.

5. The eyepiece optical system according to claim 4, wherein an air interval between the lens disposed nearest to the observer side and a lens disposed next to the lens disposed nearest to the observer side is 0.5 mm or less irrespective of a distance in a radial direction from an optical axis.

6. The eyepiece optical system according to claim 4, wherein a positive lens, a negative lens, and a positive lens are arranged in order from an object side to the observer side.

7. An imaging device comprising:
an imaging optical system for capturing an image of a subject as an optical image;
an eyepiece optical system for viewing the image of the subject; and
an imaging element for converting the optical image formed by the imaging optical system into an electric signal;
the eyepiece optical system including a lens,
a surface nearest to an observer side of the lens disposed nearest to the observer side being formed in a convex shape on the observer side, and
the eyepiece optical system satisfying a conditional expression (1) in the following:

$$|RL/DH|<1.7 \qquad (1)$$

where
RL is a radius of curvature of the surface nearest to the observer side, and
DH is a shortest distance in a radial direction from an optical axis to an edge surface of the lens nearest to the observer side.

8. An imaging device comprising:
an imaging optical system for capturing an image of a subject as an optical image;
an eyepiece optical system for viewing the image of the subject; and
an imaging element for converting the optical image formed by the imaging optical system into an electric signal;
the eyepiece optical system including a lens,
a surface nearest to an observer side of the lens disposed nearest to the observer side being formed in a convex shape on the observer side, and
the eyepiece optical system satisfying a conditional expression (2) in the following:

$$|RL/KL|>2.0 \qquad (2)$$

where
RL is a radius of curvature of the surface nearest to the observer side, and
KL is a thickness of an edge surface of the lens nearest to the observer side.

* * * * *